United States Patent
Tang et al.

(10) Patent No.: US 10,459,566 B2
(45) Date of Patent: Oct. 29, 2019

(54) DISPLAY DEVICE AND MANUFACTURING METHOD THEREOF

(71) Applicant: NOVATEK MICROELECTRONICS CORP., HsinChu (TW)

(72) Inventors: Yu-Ying Tang, Taoyuan (TW); Chih-Chang Lai, Taichung (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 160 days.

(21) Appl. No.: 15/605,999

(22) Filed: May 26, 2017

(65) Prior Publication Data
US 2018/0341361 A1 Nov. 29, 2018

(51) Int. Cl.
G06F 3/041 (2006.01)
G06F 3/044 (2006.01)

(52) U.S. Cl.
CPC ............ G06F 3/0416 (2013.01); G06F 3/044 (2013.01); G06F 3/0412 (2013.01); G06F 2203/04103 (2013.01); G06F 2203/04111 (2013.01)

(58) Field of Classification Search
CPC .......... G06F 3/0416; G06F 3/0412; G06F 2203/04103; G06F 3/044; G06F 2203/04111
See application file for complete search history.

(56) References Cited

U.S. PATENT DOCUMENTS

| | | | |
|---|---|---|---|
| 9,250,735 B2 | 2/2016 | Kim et al. | |
| 2015/0205403 A1* | 7/2015 | Li | G06F 3/044 345/174 |
| 2016/0019854 A1* | 1/2016 | Liu | G09G 3/3648 345/204 |
| 2017/0123538 A1* | 5/2017 | Kuo | G06F 3/0412 |

FOREIGN PATENT DOCUMENTS

TW    I464854 B    12/2014

* cited by examiner

*Primary Examiner* — Dmitriy Bolotin
(74) *Attorney, Agent, or Firm* — McClure, Qualey & Rodack, LLP

(57) ABSTRACT

A touch display panel includes a first patterned metal layer and a second patterned metal layer. The first patterned metal layer includes a first signal line and one or more first segments. The second patterned metal layer is disposed above the first patterned metal layer and includes a second signal line and one or more second segments, wherein the one or more second segments are electrically connected to the one or more first segments such that the one or more first segments and the one or more second segments collectively form at least a part of a touch sensing line.

20 Claims, 5 Drawing Sheets

DISPLAY DEVICE AND MANUFACTURING METHOD THEREOF

TECHNICAL FIELD

The disclosure relates in general to a display device, a display panel and a manufacturing method thereof.

BACKGROUND

Touch display panels have been widely used in various kinds display devices, such as liquid crystal display (LCD). When an image is displayed by the display device, a user may contact (e.g., by pressing or touching) the touch display panel to generate touch events and control the device.

One kind of the touch display panel is called self in-cell touch display panel, in which a plurality of touch sensing lines are used as touch sensing electrodes in a touch mode of the display device and used as common voltage (Vcom) electrodes in a display mode of the display device.

However, this kind of touch display panels need extra metal layer for forming the touch sensing lines, resulting in a high cost of the manufacturing process. In order to solve this issue, the industry has tried to dispose the touch sensing lines parallel with the data lines in the same metal layer, but this would significantly reduce the aperture ratio of the display device.

SUMMARY

The disclosure is directed to a display device and a manufacturing method thereof. In the proposed display device, the touch signal lines are formed in the patterned metal layers in which the first signal lines and the second signal lines are formed, so that an extra metal layer is saved to form the touch signal lines and the cost of the display device can be reduced. Furthermore, because most parts of the touch signal lines are underneath the metal patterns of the second signal lines, the reduction of the aperture ratio of the display device caused by forming the touch signal lines can be significantly reduced.

According to one embodiment, a touch display panel is provided. The touch display panel includes a first patterned metal layer and a second patterned metal layer. The first patterned metal layer includes a first signal line and two first segments disposed respectively on two sides of the first signal line. The second patterned metal layer is disposed above the first patterned metal layer and includes a second signal line and a second segment, wherein the second segment is located above the first signal line to cross over the first signal line and electrically connected between the two first segments such that the two first segments and the second segment collectively form a part of a touch sensing line.

According to one embodiment, a touch display panel is provided. The touch display panel includes a first patterned metal layer and a second patterned metal layer. The first patterned metal layer includes a first signal line and one or more first segments. The second patterned metal layer is disposed above the first patterned metal layer and includes a second signal line and one or more second segments, wherein the one or more second segments are electrically connected to the one or more first segments such that the one or more first segments and the one or more second segments collectively form at least a part of a touch sensing line.

According to one embodiment, a display device is provided. The display device includes a touch display panel and a controller. The touch display panel includes a first patterned metal layer and a second patterned metal layer. The first patterned metal layer includes a first signal line and two first segments disposed respectively on two sides of the first signal line. The second patterned metal layer is disposed above the first patterned metal layer and includes a second signal line and a second segment, wherein the second segment is located above the first signal line to cross over the first signal line and electrically connected between the two first segments such that the two first segments and the second segment collectively form a part of a touch sensing line. The controller couples to the first patterned metal layer and the second patterned metal layer, and is configured to control the first signal line and the second signal line for a display operation, and to control the touch sensing line for a touch control operation.

According to one embodiment, a manufacturing method of a display device is provided. A first patterned metal layer including a first signal line and two first segments disposed respectively on two sides of the first signal line is formed. A second patterned metal layer disposed above the first patterned metal layer and including a second signal line and a second segment is formed, wherein the second segment is electrically connected to the two first segments for forming a part of a touch sensing line, and the second segment is located above the first signal line and crosses over the first signal line.

Figure 1A:
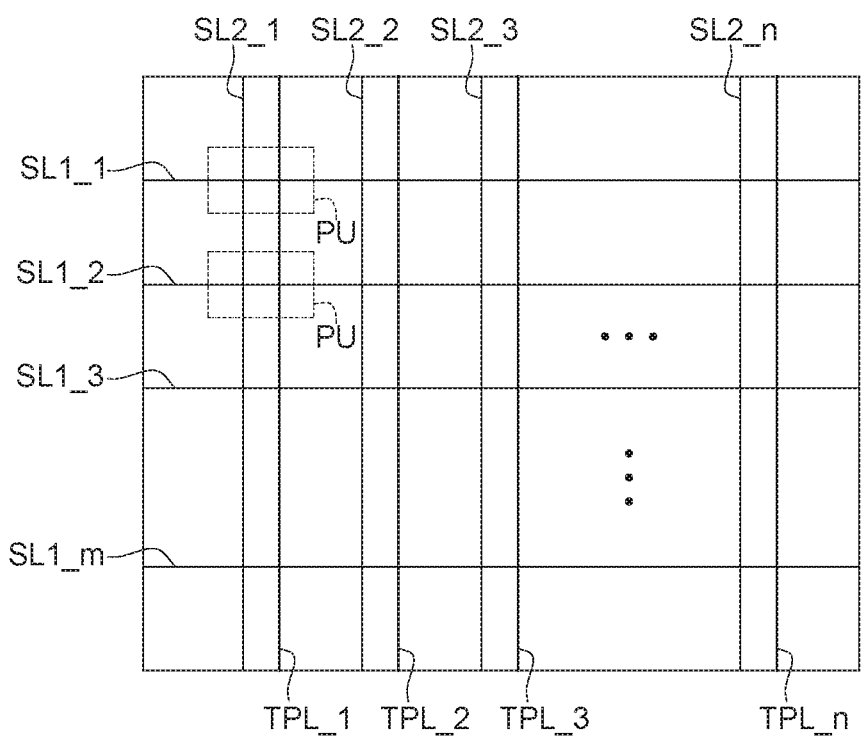
FIG. 1A is a block diagram of an example touch display panel in accordance with an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments are disclosed below for elaborating the invention. However, the embodiments of the disclosure are for detailed descriptions only, not for limiting the scope of protection of the invention. Furthermore, secondary or less relevant elements are omitted in the accompanying diagrams of the embodiments for highlighting the technical features of the invention.

FIG. 1A is a block diagram of an example touch display panel 102 in accordance with an embodiment of the present disclosure. The touch display panel 102 may be a self in-cell touch display panel, in which a plurality of touch sensing lines can be used as touch sensing electrodes in a touch mode of a display device and may be used as common voltage (Vcom) electrodes in a display mode of the display device. However, the touch display panel 102 may also be other types of touch display panels in different embodiments. The touch display panel 102 includes one or more first signal lines SL1_1-SL1_m, one or more second signal lines SL2_1-SL2_n and one or more touch sensing lines TPL_1-TPL_n. The touch sensing lines can also be called sensing traces.

In the example of FIG. 1A, the first and second signal lines SL1_1-SL1_m, SL2_1-SL2_n are orthogonally arranged to each other in the touch display panel 102. The intersections of the first and second signal lines SL1_1-SL1_m, SL2_1-SL2_n are coupled to a plurality of pixel units PU that each of which may include a pixel switch such as a Thin Film Transistor (TFT).

Here, an electrode for controlling the pixel switch's conductive state is referred to as "a gate line" or "a scan line", while an electrode for supporting different levels of gray-scale voltage needed for a display (such as a Liquid Crystal Display (LCD)) illumination is referred to as "a source line" or "a data line". For example, when a high voltage is applied to the scan line, the pixel switch is turned on, introducing a gray-scale voltage from the data line. The gray-scale voltage is then applied on the pixel electrodes of the pixel unit for display illumination.

In an embodiment, the first signal lines SL1_1-SL1_m are used as the gate lines and the second signal lines SL2_1-SL2_n are used as the data lines in a display mode of the display device 100. Alternatively, the first signal lines SL1_1-SL1_m are used as the data lines and the second signal lines SL2_1-SL2_n are used as the gate lines in the display mode of the display device 100.

According to embodiments of the disclosure, the touch signal lines TPL_1-TPL_n are formed in patterned metal layers in which the first signal lines SL1_1-SL1_m and the second signal lines SL2_1-SL2_n are formed, so that an extra metal layer is saved to form the touch signal lines TPL_1-TPL_n and the cost of the display device can be reduced. Furthermore, most or large parts of the touch signal lines TPL_1-TPL_n can be arranged to be underneath the metal patterns of the second signal lines SL2_1-SL2_n, so that the touch signal lines TPL_1-TPL_n occupy less opening area. Therefore, the aperture ratio of each pixel unit PU is increased. Details of the arrangements of the first signal lines SL1_1-SL1_m, the second signal lines SL2_1-SL2_n and the touch signal lines TPL_1-TPL_n are described in reference to FIGS. 3A-3C.

Figure 1B:
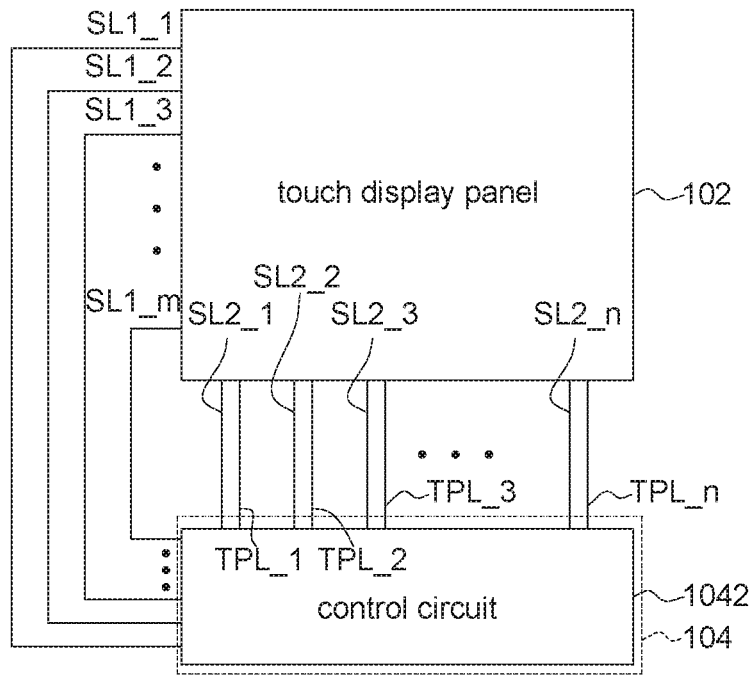
FIG. 1B is a block diagram of an example display device according to an embodiment of the present disclosure.

FIG. 1B is a block diagram of an example display device 100 according to an embodiment of the present disclosure. The display device 100 can be included in, for example, mobile telephone, personal computer, or any mobile or non-mobile computing device that includes a touch screen.

The display device 100 includes the touch display panel 102 and a controller 104. The controller 104 is coupled to the touch display panel 102, and is configured to control the first signal lines SL1_1-SL1_m and the second signal lines SL2_1-SL2_n for a display operation, and to control the touch sensing lines TPL_1-TPL_n for a touch control operation.

The controller 104 includes a control circuit 1042, which is coupled to the first signal lines SL1_1-SL1_m, the second signal lines SL2_1-SL2_n and the touch sensing lines TPL_1-TPL_n. The control circuit 1042 can be an integrated circuit (e.g., an application specific integrated circuit (ASIC)) which can at least function as a gate driver, a data driver and/or a touch sensing controller.

In the display mode, the control circuit 1042 may generate gate driving signals to the gate lines (e.g., first signal lines SL1_1-SL1_m) and data driving signals to the data lines (e.g., second signal lines SL2_1-SL2_n) according to a display clock, so as to apply the gray-scale voltages to particular pixel units PU for display operations. In the touch mode of the display device 100, the control circuit 1042 may control the touch sensing lines TPL_1-TPL_n for a touch control operation, such as using the touch sensing lines TPL_1-TPL_n for transmitting touch sensing signals.

Figure 1C:
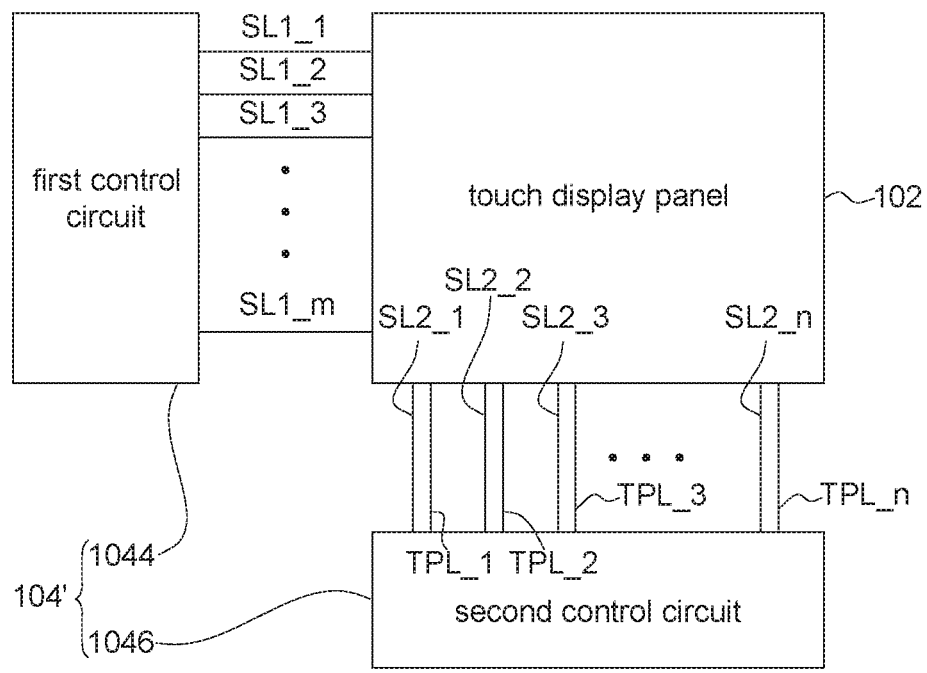
FIG. 1C is block diagram of a display device according to another embodiment of the present disclosure.

FIG. 1C is block diagram of a display device 100' according to another embodiment of the present disclosure. The main difference between the display device 100' and the display device 100 illustrated in FIG. 1B is that the controller 104' of the display device 100' includes a first control circuit 1044 and a second control circuit 1046.

The first control circuit 1044 couples to the first signal lines SL1_1-SL1_m, and is configured to drive the first signal lines SL1_1-SL1_m as the gate lines in the display mode of the display device 100'. For example, the first control circuit 1044 is gate driver, and may generate gate driving signals to the first signal lines SL1_1-SL1_m in the display mode in response to a display clock.

The second control circuit 1046 couples to the second signal lines SL2_1-SL2_n and the touch signal lines TPL_1-TPL_n, and is configured to drive the second signal lines SL2_1-SL2_n as the data lines in the display mode of the display device 100' and to control the touch signal lines TPL_1-TPL_n for touch control operations in a touch mode of the display device 100'. In an embodiment, the second control circuit 1046 is implemented by integrating the data driver and the touch sensing controller into a single integrated circuit.

Figure 2:
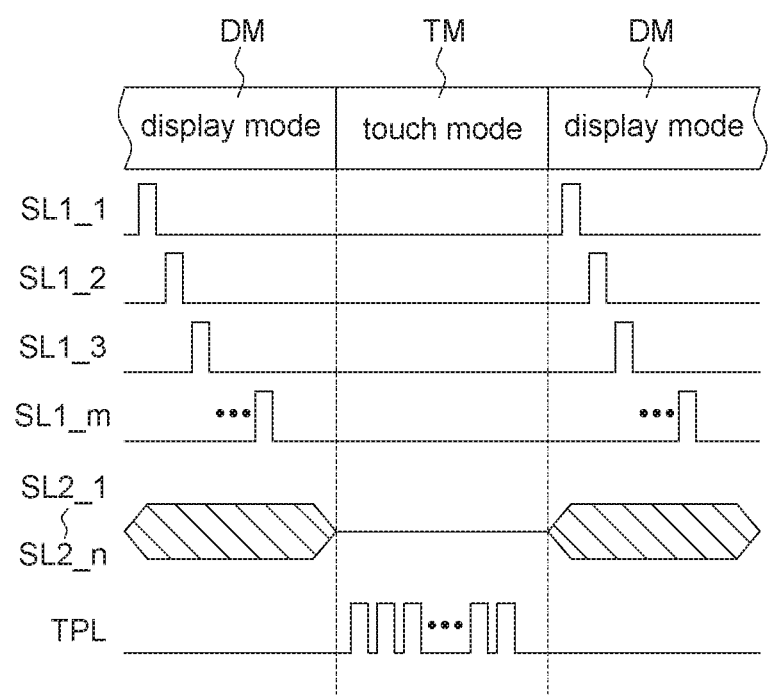
FIG. 2 is an abbreviated timing chart illustrating operation of the display device in accordance with an embodiment of the present disclosure.

FIG. 2 is an abbreviated timing chart illustrating operation of the display device in accordance with an embodiment of the present disclosure. The embodiment of FIG. 2 can be applied to such as (but not limited to) any one of the embodiments in the disclosure.

In the example of FIG. 2, the display device is alternately switched between the display mode DM and the touch mode TM. For the ease of illustration, the first signal lines SL1_1-SL1_m are used as gate lines and the second signal lines SL2_1-SL2_n are used as data lines in the display mode DM of the display device, but it is understood that the present disclosure is not limited thereto.

When the display device is operated in the display mode DM (display operation), gate driving signals are applied to the first signal lines SL1_1-SL1_m, gray-scale voltages are applied to the second signal lines SL2_1-SL2_n, and the touch signal lines TPL_1-TPL_n are used as common voltage (Vcom).

For example, when the first signal line SL1_1 is scanned (gate driving signal is applied), pixel switches in the row of pixel units coupled to the first signal line SL1_1 are turned on, so that the gray-scale voltages are applied to the pixel electrodes of each pixel unit in the row via the second signal lines SL2_1-SL2_n. Values of the gray-scale voltages are in the range between the high level voltage and the low level voltage of the common voltage for example, depending on the content to be displayed on the touch display panel.

When the display device is operated in the touch mode TM (touch sensing operation), the touch signal lines TPL_1-

TPL_n are used as electrodes for transmitting the touch sensing signals, as shown in FIG. 2.

Although in FIG. 2 the first and second signal lines SL1_1-SL1_m, SL2_1-SL2_n are set to a low level during the touch mode TM, the present disclosure is not limited thereto. In an embodiment, touch sensing signals or other types of in-phase signals are also applied to the first and second signal lines SL1_1-SL1_m; SL2_1-SL2_n during the touch mode TM, so that the loading of the touch sensing circuit (e.g., controller 104) are reduced, thereby improving the touch sensing ability.

In another embodiment, the first signal lines SL1_1-SL1_m and/or the second signal lines SL2_1-SL2_n are set to a high impedance state (i.e., floating state) during the touch mode TM, so that the touch sensing signals transmitted on the touch signal lines TPL_1-TPL_n can couple to the floated signal lines.

Figure 3A:
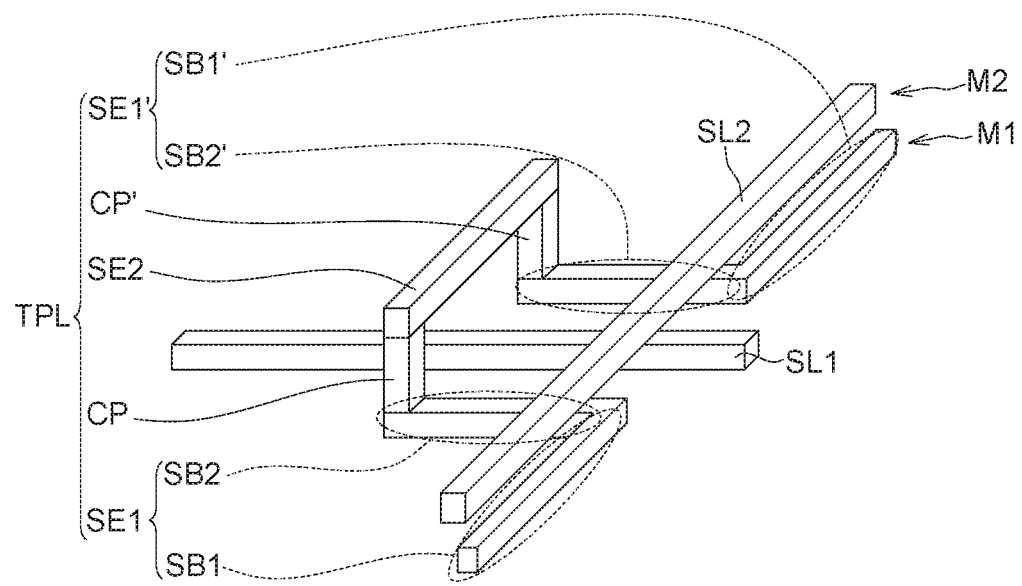
FIG. 3A is a perspective view of a partial structure of the touch display panel in accordance with an embodiment of the present disclosure.
Figure 3B:
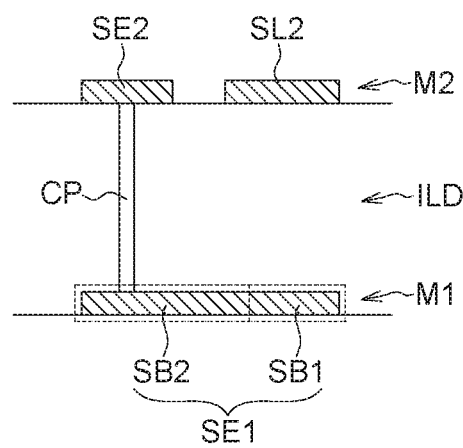
FIG. 3B is a cross-sectional view of a partial structure of the touch display panel in accordance with an embodiment of the present disclosure.
Figure 3C:
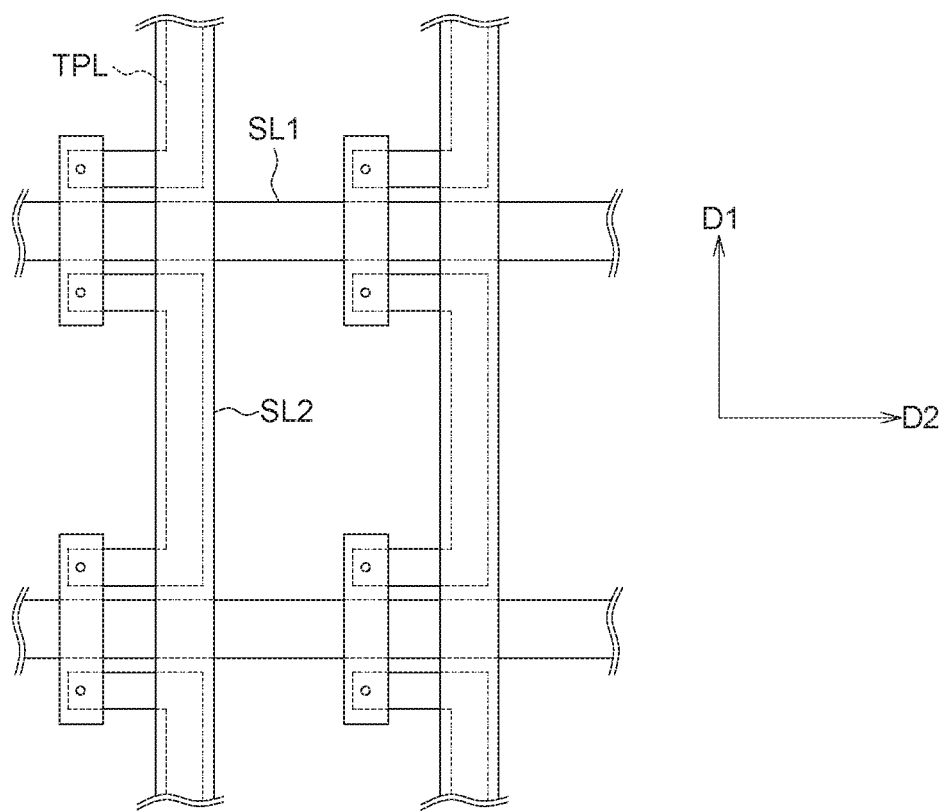
FIG. 3C is a top view of a partial structure of the touch display panel in accordance with an embodiment of the present disclosure.

Please refer to FIGS. 3A-3C. FIG. 3A is a perspective view of a partial structure of the touch display panel in accordance with an embodiment of the present disclosure. FIG. 3B is a cross-sectional view of a partial structure of the touch display panel in accordance with an embodiment of the present disclosure. FIG. 3C is a top view of a partial structure of the touch display panel in accordance with an embodiment of the present disclosure.

Below, the first signal line SL1 can be any of the first signal lines SL1_1-SL1_m, the second signal line SL2 can be any of the second signal lines SL2_1-SL2_n, and the touch sensing line TPL can be any of the touch sensing line TPL_1-TPL_n.

As shown in FIGS. 3A and 3B, the touch display panel may include a first patterned metal layer M1 and a second patterned metal layer M2 arranged above the first patterned metal layer M1. For example, the touch display panel may include an interlayer dielectric ILD between the first patterned metal layer M1 and the second metal layer M2, and the first patterned metal layer M1 and the second patterned metal layer M2 are formed on the bottom and the top of the interlayer dielectric ILD, respectively.

As shown in FIGS. 3A and 3C, the first patterned metal layer M1 includes a first signal line SL1 extending along a first direction D1 and two first segments SE1 and SE1', wherein the two first segments SE1 and SE1' are disposed respectively on two sides of the first signal line SL1. The second patterned metal layer M2 includes a second signal line SL2 extending along a second direction D2 and a second segment SE2, wherein the second segment SE2 is electrically connected to the two first segments SE1 and SE1' for forming a part of a touch sensing line TPL. In particular, the second segment SE2 is located above the first signal line SL1 and crosses over the first signal line SL1. The first direction D1 and the second direction D2 are different. For example, the first direction D1 is perpendicular to the second direction D2.

Further, the first segment SE1 includes a first sub-segment SB1 and a second sub-segment SB2, wherein the first sub-segment SB1 is located in the orthographic projection of the second signal line SL2 and the second sub-segment is SB2 electrically connected between the first sub-segment SB1 and the second segment SE2.

Because the first sub-segments SB1 of the touch signal lines TPL are located in the orthographic projection of the second signal line SL2, the first sub-segments SB1 are underneath the metal patterns of the second signal lines SL2. Therefore, the touch signal lines TPL occupies less opening area, so that the aperture ratio of each pixel unit is increased.

In an embodiment, each of the first segments SE1 and SE1' can be implemented as an L-shape metal pattern. As shown in FIGS. 3A and 3C, the second sub-segment SB2 is arranged parallel with the first signal line SL1 (e.g., along the first direction D1), and the first sub-segment SB1 is arranged perpendicular to the second sub-segment SB2 (e.g., along the second direction D2). It is understood that the present disclosure is not limited thereto, as long as the extending directions of the first sub-segment SB1/SB1' and the second sub-segment SB2/SB2' are different.

Moreover, in an embodiment, one end of the second segment SE2 is electrically connected to the second sub-segment SB2 of one of the two first segments SE1, SE1', and the other end of the second segment SE2 is electrically connected to the second sub-segment SB2' of the other one of the two first segments SE1, SE1'. As shown in FIGS. 3A and 3B, a plurality of contact plugs such as CP and CP' are formed in the interlayer dielectric ILD and electrically connected between the second segment SE2 and the two first segments SE1, SE1'. The contact plug CP is disposed between the one end of the second segment SE2 and the second sub-segment SB2 of the first segments SE1, and the contact plug CP' is disposed between the one end of the second segment SE2 and the second sub-segment SB2' of the first segments SE1'.

The present disclosure further provides a manufacturing method of the display device. The elements in the present embodiment sharing similar or the same labels with those in the previous embodiments are similar or the same elements, and the description of which is omitted.

Please refer to FIGS. 1A, 1B and 3A-3C. A touch display panel 102 is formed. A first patterned metal layer M1 including a first signal line SL1 and two first segments SE1 and SE1' disposed respectively on two sides of the first signal line SL1 is formed on a substrate. Then, an interlayer dielectric ILD is formed on the first patterned metal layer M1. Next, a second patterned metal layer M2 disposed above the first patterned metal layer M1 and including a second signal line SL2 and a second segment SE2 is formed on the top of the interlayer dielectric ILD, wherein the second segment (SE2) is electrically connected to the two first segments SE1 and SE1' for forming a part of a touch sensing line TPL, and the second segment (SE2) is located above the first signal line SL1 and crosses over the first signal line SL1. A controller 104 (or 104') electrically connected to the first patterned metal layer M1 and the second patterned metal layer M2 is disposed in the display device, wherein the controller 104 (or 104') is configured to control the first signal line SL1 and the second signal line SL2 for a display operation, and to control the touch sensing line TPL for a touch control operation.

In an embodiment, the two first segments SE1 and SE1' are formed by a first patterning process, and the second segment SE2 is formed by a second patterning process. Further, in an embodiment, the first signal line SL1 is formed by the first patterning process, and the second signal line SL2 is formed by the second patterning process. That is, the first signal line SL1 and the two first segments SE1 and SE1' can be formed by the same patterning process, and the second signal line SL2 and the second segment SE2 can be formed by another patterning process.

Moreover, to electrically connect the second segment SE2 to the first segments SE1 and SE1', a plurality of contact plugs CP and CP' can be formed in the interlayer dielectric ILD, wherein the contact plugs CP and CP' can be electrically connected between the second segment SE2 and the two first segments SE1 and SE1'.

To sum up, in accordance with the embodiments of the present disclosure, the segments of each of touch sensing TPL_1-TPL_n line can be arranged into two parts: (i) segments formed in the first patterned metal layer M1 and underneath the metal patterns of the second signal lines SL2_1-SL2_n, and (ii) segments formed in the second patterned metal layer M2 and crossing over the first signal lines SL1_1-SL1_m.

Advantageously, the touch signal lines TPL_1-TPL_n are formed in the patterned metal layers in which the first signal lines SL1_1-SL1_m and the second signal lines SL2_1-SL2_n are formed, so that extra metal layers can be saved to form the touch signal lines TPL_1-TPL_n and the cost of the display device can be reduced. Furthermore, because most or large parts of the touch signal lines TPL_1-TPL_n can be arranged to be underneath the metal patterns of the second signal lines SL2_1-SL2_n, the reduction of the aperture ratio of the display device caused by forming the touch signal lines TPL_1-TPL_n can be significantly reduced.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A touch display panel, comprising:
a first patterned metal layer comprising a first signal line and two first segments disposed respectively on two sides of the first signal line;
a second patterned metal layer, disposed above the first patterned metal layer, comprising a second signal line and a second segment, wherein the second segment is located above the first signal line to cross over the first signal line and electrically connected between the two first segments such that the two first segments and the second segment collectively form a part of a touch sensing line;
an interlayer dielectric between the first patterned metal layer and the second metal layer and having a first opening and a second opening; and
at least one contact plug formed in the interlayer dielectric, wherein the contact plug is a straight line having a first end and a second end, wherein the first end is in contact with the second segment within the first opening and the second end is in contact with one of the two first segments within the second opening.

2. The touch display panel according to claim 1, wherein each of the first segments of the touch sensing line comprises:
a first sub-segment located in an orthographic projection of the second signal line; and
a second sub-segment electrically connecting between the first sub-segment and the second segment.

3. The touch display panel according to claim 2, wherein one end of the second segment is electrically connected to the second sub-segment of one of the two first segments, and the other end of the second segment is electrically connected to the second sub-segment of the other one of the two first segments.

4. The touch display panel according to claim 2, wherein the second sub-segment is arranged parallel with the first signal line.

5. The touch display panel according to claim 4, wherein the first sub-segment is arranged perpendicular to the second sub-segment.

6. The touch display panel according to claim 1, wherein the second segment of the touch sensing line is arranged parallel with the second signal line on the second metal layer.

7. The touch display panel according to claim 1, wherein the first signal line and the second signal line are used as a gate line and a source line, respectively, during the display operation.

8. The touch display panel according to claim 1, wherein the first signal line and the second signal line are used as a source line and a gate line, respectively, during the display operation.

9. A touch display panel, comprising:
a first patterned metal layer comprising a first signal line and one or more first segments; and
a second patterned metal layer, disposed above the first patterned metal layer, comprising a second signal line and one or more second segments, wherein the one or more second segments are electrically connected to the one or more first segments such that the one or more first segments and the one or more second segments collectively form at least a part of a touch sensing line;
an interlayer dielectric between the first patterned metal layer and the second metal layer and having a first opening and a second opening; and
at least one contact plug formed in the interlayer dielectric, wherein the contact plug is a straight line having a first end and a second end, wherein the first end is in contact with the one or more second segments within the first opening and the second end is in contact with one or more first segments within the second opening.

10. The touch display panel according to claim 9, wherein one of the first and second signal lines is a gate line and the other one of the first and second signal lines is a source line.

11. The touch display panel according to claim 9, wherein the first and second signal lines are disposed to be perpendicular to each other.

12. The touch display panel according to claim 9, wherein the one or more first segments comprise two first segments respectively located on two sides of the first signal line, and the one or more second segments comprise one second segment connected between the two segments of the one or more first segments.

13. The touch display panel according to claim 12, wherein each of the two first segments comprises a sub-segment disposed in an orthographic projection the second signal line.

14. A display device, comprising:
a touch display panel, comprising:
a first patterned metal layer comprising a first signal line and two first segments disposed respectively on two sides of the first signal line;
a second patterned metal layer, disposed above the first patterned metal layer, comprising a second signal line and a second segment, wherein the second segment is located above the first signal line to cross over the first signal line and electrically connected between the two first segments such that the two first segments and the second segment collectively form a part of a touch sensing line;
an interlayer dielectric between the first patterned metal layer and the second metal layer and having a first opening and a second opening; and
at least one contact plug formed in the interlayer dielectric, wherein the contact plug is a straight line having a first end and a second end, wherein the first end is in contact with the second segment within the first opening and the second end is in contact with one of the two first segments within the second opening; and a controller, coupled to the first patterned metal layer and the second patterned metal layer, configured to control the first signal line and the second signal line for a display operation, and to control the touch sensing line for a touch control operation.

15. The display device according to claim 14, wherein the controller comprises:
a control circuit, coupled to the first signal line, the second signal line and the touch sensing line, configured to drive the first signal line and the second signal line as a gate line and a date line, respectively, in the display operation, and to control the touch sensing line for the touch control operation.

16. The display device according to claim 14, wherein the controller comprises:
a first control circuit, coupled to the first signal line, configured to drive the first signal line as a gate line in the display operation; and
a second control circuit, coupled to the second signal line and the touch sensing line, configured to drive the second signal line as a data line in the display operation and to control the touch sensing line for the touch control operation.

17. A manufacturing method of a touch display panel, comprising:
forming a first patterned metal layer comprising a first signal line and two first segments disposed respectively on two sides of the first signal line;
forming a second patterned metal layer, disposed above the first patterned metal layer, comprising a second signal line and a second segment, wherein the second segment is electrically connected to the two first segments for forming a part of a touch sensing line, and the second segment is located above the first signal line and crosses over the first signal line;
forming an interlayer dielectric between the first patterned metal layer and the second metal layer and the interlayer dielectric having a first opening and a second opening; and
forming at least one contact plug in the interlayer dielectric, wherein the contact plug is a straight line having a first end and a second end, wherein the first end is in contact with the second segment within the first opening and the second end is in contact with one of the two first segments within the second opening.

18. The manufacturing method according to claim 17, wherein each of the first segments of the touch sensing line comprises:
a first sub-segment located in the orthographic projection of the second signal line; and
a second sub-segment electrically connecting between the first sub-segment and the second segment.

19. The manufacturing method according to claim 17, wherein the two first segments are formed by a first patterning process, and the second segment is formed by a second patterning process.

20. The manufacturing method according to claim 19, wherein the first signal line is formed by the first patterning process, and the second signal line is formed by the second patterning process.

* * * * *